United States Patent
Aizu

[11] 3,745,537
[45] July 10, 1973

[54] MEMORY ELEMENTS UTILIZING GYROELECTRIC SUBSTANCE AND METHOD OF OPERATING SAME

[75] Inventor: Keichiro Aizu, Tokyo, Japan

[73] Assignee: Kabushiki Kaisha Hitachi Seisakusho, Tokyo-To, Japan

[22] Filed: May 3, 1971

[21] Appl. No.: 139,925

Related U.S. Application Data

[63] Continuation-in-part of Ser. No. 370,439, May 27, 1964, abandoned.

[52] U.S. Cl. .......................... 340/173 R, 340/173.2
[51] Int. Cl. .................... G11c 11/00, G11c 11/22
[58] Field of Search .................... 340/173.2, 173 R

[56] References Cited
UNITED STATES PATENTS

| | | | |
|---|---|---|---|
| 2,560,430 | 7/1951 | Friend | 179/100.2 |
| 2,928,075 | 3/1960 | Anderson | 340/173.2 |
| 2,960,914 | 11/1960 | Rogers | 88/61 |

*Primary Examiner*—Terrell W. Fears
*Attorney*—Marmorek & Bierman

[57] ABSTRACT

A memory element utilizing the unique phenomenon of a gyroelectric substance wherein the hysteresis characteristics of field as against electric gyration has two states of mutually opposite code of electro-gyration under the condition of the electric field being zero. Information is stored in this memory element with one of the states of electro-gyration being "1" and the other "0", then linear polarized light is irradiated onto this gyroelectric substance to detect the rotational angle of the vibrating surface of the light passing through this material, thereby reading out information stored in this gyroelectric material. The memory element is used in connection with writing-in and reading-out, with a light switch, and with a logical operation apparatus.

17 Claims, 19 Drawing Figures

MEMORY ELEMENTS UTILIZING GYROELECTRIC SUBSTANCE AND METHOD OF OPERATING SAME

REFERENCE TO RELATED APPLICATION

This is a continuation-in-part application of my copending application Ser. No. 370,439 filed May 27, 1964 now abandoned for "Gyroelectric Memory Elements and Their Applications."

BACKGROUND OF THE INVENTION

This invention relates to memory elements in which gyroelectric substance is utilized, and a method for operating such memory elements.

Gyroelectrics are defined as substances whose optical rotatory power is nonzero at no bias electric field and reversible in sign by means of a bias electric field. (Gyroelectrics must therefore be ferroelectric.)

The present invention is based on experimental and theoretical findings relating to gyroelectrics.

SUMMARY OF THE INVENTION

It is a prime object of the present invention to provide a memory element affording simple writing-in and reading-out and rapid operation with non-destructive memory without loss irrespective of the number of repetitions of reading-out operation.

It is another object to provide a memory element suitable for electrical (dielectrical) writing-in and optical reading-out (by use of transmitted light).

It is a further object to provide, through the use of memory elements of the above-stated character, means such as memory devices, light switches, light modulators, and logical operation devices.

In electronic computers, at present, various types of memory elements are being used. Of these, memory elements utilizing magnetic cylinders, magnetic tapes, and the like are capable of performing non-destructive reading-out and are inexpensive. However, these memory elements necessitate the use of mechanical moving parts and require relatively long time for writing-in and reading-out.

In contrast, the use of the ferromagnetic materials such as ferrite or of the ferroelectrics such as barium titanate affords relatively rapid writing-in and reading-out, but since the reading-out is destructive, it is necessary to resort to writing-in again after each time of the reading-out operation.

BRIEF EXPLANATION OF DRAWING

The nature and details of the present invention, which, in its broader aspects, contemplates the elimination of the above-mentioned difficulties to be described more fully hereinafter, will be best understood by reference to the following description taken in conjunction with the accompanying drawings in which like parts are designated by like reference characters, and in which.

DETAILED DESCRIPTION OF INVENTION

As conductive to a full understanding and appreciation of the nature and utility of the present invention, the following brief consideration of the general art and difficulties heretofore encountered is believed to be desirable.

Figure 1:
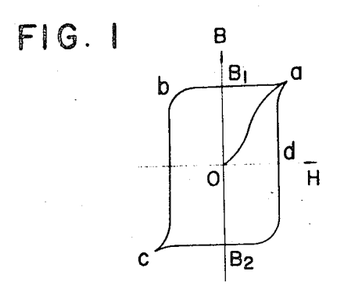
FIG. 1 is a graphical representation showing the hysteresis characteristic of a ferromagnetic material.

The general principle of writing in and reading out by means of ferromagnetic means may be described with respect to the hysteresis characteristic curves of a ferromagnetic material shown in FIG. 1, in which the abscissa represents the strength H of a magnetic field, and the ordinate represents the intensity B of magnetic induction. As the strength of the magnetic field is increased from its zero state in the positive direction, magnetization proceeds along the line $O_a$ until, at a certain value of $B_1$ of magnetic induction, saturation occurs. If, from this state, the strength of the magnetic field is decreased, the magnetic induction will not return to zero but will be maintained in the $B_1$ state (herein designated, for example, the "0" state) even if the magnetic field is completely removed.

Then, when a magnetic field is applied to the ferromagnetic material in the opposite direction, magnetization takes place along a path as indicated by curve bc in the opposite direction until a state $B_2$ of opposite saturation is reached (this state being herein designated, for example, the "1" state). Then, if the magnetic field is removed, this state $B_2$ will be maintained. That is, the fact that two values $B_1$ and $B_2$ remain, even without a magnetic field, means that one bit of information can be memorized or stored.

To read out information stored in this manner, a magnetic field corresponding to $0d$ is applied, whereupon, at that instant, the "1" state changes into the "0" state, and an output proportional to an electromotive force $dB/dt$ is produced in an outside circuit by the variation in B. In the case when the prior state is the "0" state, an electromotive force is not produced, whereby it is possible to determine whether the prior state was "0" or whether it was "1." However, since the state returns to the "0" state in all cases after reading out, the memory storage is of the destructive type.

The present invention contemplates the provision of a new memory element in which the above described drawback of ordinary ferromagnetic memory elements is eliminated, and which is characterized by the use therein of the aforemention gyroelectrics.

As is well known, when linearly polarized light passes through a substance such as quartz or like crystal, a gas, a liquid, or a solution such as glucose in a magnetic field, the plane of polarization rotates. This characteristic of such substances is known as optical activity. In addition, isotropic substances become optically anisotropic in a static electric field and, when light is projected thereonto, cause double refraction, which phenomenon is also well known as the so-called Kerr effect.

The rotatory polarization according to the present invention differs from that mentioned above in that it occurs in only certain kinds of crystals and in that the rotatory power is inverted depending on the electric field.

Figure 2:
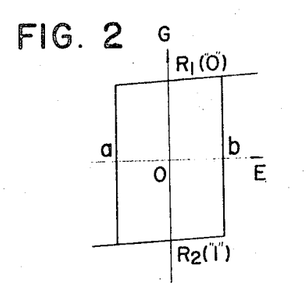
FIG. 2 is a graphical representation showing the hysteresis characteristic of the optical rotatory power with respect to the electric field of a gyroelectric material used in the memory element of the invention.

More specifically, these kinds of crystals exhibit hysteresis characteristics as indicated in FIG. 2, in which the abscissa represents applied electric field E, and the ordinate represents rotatory power G, the curves being indicated in a representative manner. The two states which can be assumed at zero voltage will be designated as the "0" and "1" states. It will be assumed that the initial state is the "0" state, the rotational angle at this time being designated by $R_1$. Then, as voltage (electric field) is applied in the minus direction from zero voltage, the rotational angle R undergoes almost no change with rising voltage up to a certain voltage value (oa). However, above this critical voltage value (This critical voltage value is called "coercive electric field"), the rotational angle becomes zero and then becomes $R_2$ rotating in the opposite direction. Then, as the voltage is decreased from this state, the rotational angle does not return to zero, and the state of $R_2$ is maintained even when the voltage is completely removed.

Furthermore, when the voltage is applied in the opposite direction and reached the value oa, the plane of polarization rotates and returns to the original rotational angle $R_1$, the angular state of $R_1$ being maintained even after removal of the voltage.

That is, either of two values, $R_1$ or $R_2$, remains even after removal of the voltage, and, moreover, when a voltage exceeding a certain value is applied, an alternation of states, "0" to "1" or "1" to "0," occurs. This characteristic of these crystals means that they can be used as memory elements, and reading out can be accomplished by determining whether the polarization plane is in the "0" state or whether it is in the "1" state. In this case, since each of the two states is retained, the reading out can be carried out in a non-destructive manner.

Figure 3A:
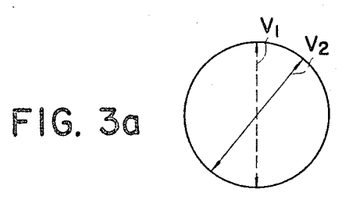
FIG. 3a and 3b are two graphical representations indicating the aforementioned two states of a gyroelectric material.
Figure 3B:
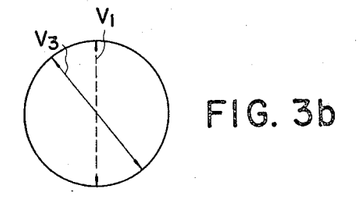

The above described states may be indicated graphically as shown in FIG. 3, in which reference character $V_1$ designates the plane of vibration of the incident light (plane-polarized light), and reference characters $V_2$ and $V_3$ designate planes of vibration of plane-polarized light leaving the crystal. The angles corresponding to the two stable states "0" and "1" of the rotatory power of the gyroelectric substance, that is, the angles formed by the plane of vibration $V_1$ and the planes of vibration $V_2$ and $V_3$, are equal, and their absolute values are proportional to the thickness of the crystal. The relationship between the gyratory power and thickness of the crystal is 3.5°/mm in the direction of the optical axis in the case of, for example, lithium tri-hydrogen selenite. This relationship becomes complicated outside the optical axis direction due to double refraction.

If, now, it is assumed that $V_1$ and $V_2$ correspond to the states "0" and "1," respectively, $V_1$ and $V_2$ will be caused to rotate mutually in opposite direction by mutually opposite sense or polarity. A gyroelectric is herein defined as a substance having the above described characteristic.

It will be apparent from the foregoing description that the memory element according to the present invention affords the provision of new memory devices in which stored information can be read out in a non-destructive manner.

DETAILED DESCRIPTION OF PREFERRED EMBODIMENT

In order to indicate still more fully the nature of the invention, the following description with respect to preferred embodiments of the invention are presented.

Figure 4:
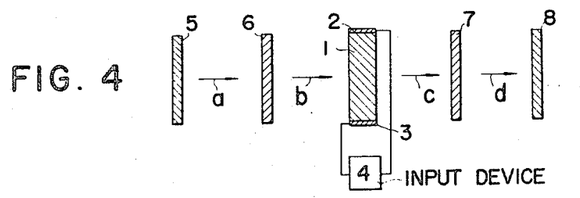
FIGS. 4 and 5 are elevational, sectional views showing examples of memory devices, in which the memory element according to the invention is used.
Figures 5, 6:
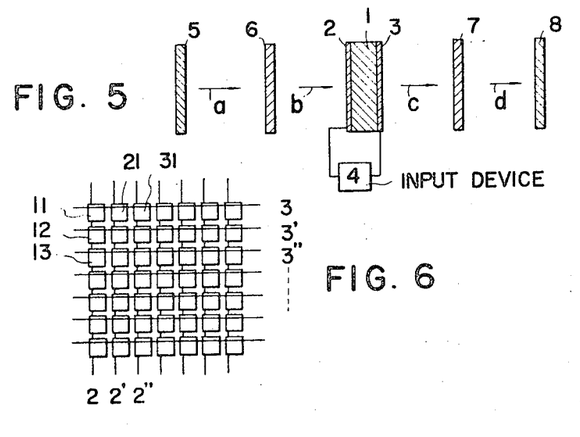
FIG. 6 is a plan view showing an example of a memory device, in which the memory element of the invention is used.

Referring to FIGS. 4 and 5, each of the embodiments shown therein of a memory device according to the present invention comprises, in coaxial alignment, a crystal plate 1 of lithium trihydrogen solenite having length and width of 30 mm and thickness between the terminal surfaces of 10 mm with the opposite terminal surfaces being disposed at a position perpendicular to the optical axis of the crystal; electrodes 2 and 3 for impressing voltage; an input signal device 4 capable of generating in the respective crystal plates of lithium trihydrogen selenite shown in FIGS. 4 and 5 voltages of 7 KV and 3 KV, respectively, a light source 5; a polarizer 6; an analyzer 7; and a detector 8. In this device, the thickness between the terminal surfaces of the crystal plate is required to be made 130 mm in case rotatory angle of the polarization plane is 45°, and 86 mm in case the rotatory angle is 30°. Also, the threshold voltage of the input signal generating source required to enable the state of gyroelectric power of lithium trihydrogen selenite to alternate is 2 KV/cm with respect to the direction of spontaneous polarization. These factors should be taken into consideration when designing the device. In this embodiment as well as subsequent embodiments, the polarization planes of both polarizes 6 and analyzer 7 must be disposed at such angles (angles constituted by the polarization planes at both elements) as to causing the light passed through the anaylzer 7 to vary (i) from brightness to darkness, or (ii) from darkness to brightness before and after alternation of the rotatory state of the gyroelectric substance (crystal plate of lithium tri-hydrogen selenite). In the case of the embodiment shown in FIGS. 4 and 5, these polarization planes are disposed at an angle of perfect darkness (70°), or in the relationship of semi-darkness, or in the opposite relationship to these (i.e., perfect brightness or semi-brightness). Also, the direction of voltage impression to the gyroelectric substance (in this embodiment, it is lithium tri-hydrogen selenite) necessary for alternating the gyroelectric state thereof may be sufficient, if the component of the impressed voltage in the direction of the spontaneous polarization exceeds the threshold voltage value (2 KV/cm in the case of lithium tri-hydrogen selenite). Lithium trihydrogen selenite possesses its optical axis in the plane perpendicular to the crystal plane ac of the substance, and its self-polarization axis in the direction perpendicular to the axis a in the crystal plane ac.

When a voltage higher than a certain predetermined value is applied by the input device 4 to the electrodes 2 and 3, either the "0" state or the "1" state is stored in the memory element 1 depending on the polarity of the voltage, whereby writing in is accomplished.

Then, the reading-out of the stored information is accomplished by polarizing by means of the polarizer 6, the light a projected by the light source 5 to produce linearly polarized light b, which is then caused to enter the memory element 1, passing the light c leaving the memory element 1 through the analyzer 7 which is so arranged as to permit the passage of only light d having a rotational angle corresponding to either the "0" state or the "1" state, and detecting the light d by means of the detector 8, in which either the "0" state or the "1" state is then read-out as passage and blocking of light.

The electrodes 2 and 3 for applying voltage to the crystal memory element may be disposed as shown in FIG. 5, in which case transparent electrodes are used. For the memory element 1, triglycine sulfate $[(CH_2NH_2COOH)_3H_2SO_4]$, sodium nitrite $(NaNO_2)$, lithium tryhydrogen selenite $[LiH_3(SeO_3)_2]$, or like gyroelectric substance is used. In general, the crystal of the memory element in most cases is so orientated that its optical axis is coincident with the passing direction of the light. The magnitude of the applied voltage necessary for transition of the state is of the order of a number of kilovolts per centimeter.

It will be immediately apparent to those skilled in the art that, by arranging a plurality of memory elements of the invention in matrix form as indicated in FIG. 6, it is possible to obtain effects similar to those of magnetic core memory matrices known heretofore. In the example shown in FIG. 6, the matrix is composed of gyroelectric memory elements 11, 12, 13, etc., and 21, 31, etc. and conductors 2, 2', 2'', etc. and 3, 3', 3'', etc., for applying voltage, and the electrodes to which these conductors are connected are transparent electrodes as shown in FIG. 5.

As described above, the memory element of this invention is of a novel type, wherein information is written-in electrically (dielectrically) and read-out by light (transmitted light). Accordingly, the time required for writing-in and reading-out is extremely short, the reading-out time, particularly, is almost zero. This memory element also has the further advantage of not containing any mechanically operating parts yet affording nondestructive reading-out, which advantage could not heretofore be attained by conventional ferromagnetic and ferroelectric materials. It has been found that this memory element can be utilized with high effectiveness in electronic computers, particularly computers wherein light is used.

The present invention, in another aspect thereof, contemplates the provision of a new holding type light switch through the utilization of the memory storing characteristic of the memory element of this invention, said light switch operating electrically without any mechanically operating parts.

Because of its high velocity, light is being used as one means for the transmission of information and for many other applications in optical instruments, its utilization in light computers being the subject of much research. However, since light is not affected by electromagnetic fields, it has not been possible to provide a quick-response switch for light, and for switching purposes, in general, only mechanical methods or indirect methods could be used.

Among the known means capable of functioning as high-speed switches, there is a device utilizing the variation of refraction of a crystal in an electric field. This device is used as a high-speed shutter in some cases, but it fails to provide a distinct contrast between bright and dark and, moreover, has required the constant application of voltage throughout its operation.

There are also certain substances with possibilities of being used as light switches because of characteristics such as optical activity and the Kerr effect. These substances, however, have not reached the stage of development where satisfactory results are obtainable because, in each case, the variation of light rotational angle is small, and it is difficult to maintain a constant angular variation unless a voltage is constantly applied.

In contrast, in the case of the memory element according to the present invention, it is possible to cause the polarization plane to rotate by means of voltage and, moreover, to hold the polarization plane even after the signal voltage has been removed, whereby it is possible to effect switching action by pulse activation.

Such a light switch is made possible through means of an arrangement and construction similar to those shown in FIGS. 4 and 5. More specifically, the switch input is applied in the form of voltage to the electrodes 2 and 3 for voltage application, and the analyzer 7 is adapted to pass only linearly polarized light in the "0" state or in the "1" state. Since the polarization plane of the light projected from the light source 5 rotates in accordance with the polarity of the voltage applied on the electrodes 2 and 3 for voltage application, the light c reaching the analyzer 7 is either passed or shut off, whereby a switching action can be obtained.

That is, the light switch, in which the memory element of this invention is used, is of new type capable of operating electrically and has no mechanical moving parts. Accordingly, this light switch produces no noise and has a long service life, and its speed in switching from the shut-off state to the passing state or from the passing state to the shut-off state in extremely high, being approximately $10^{-6}$ second.

When this light switch is used as a shutter to permit instantaneous passage of light, it is inferior, in operational speed, to the conventional shutter, in which variation of refraction in an electric field is used. However, since the variation in light rotational angle is large in the light switch of this invention, it has the advantage of pronounced contrast between bright and dark. Therefore, the light switch of this invention can be applied to uses such as switches and shutters of optical instruments and equipment and also to light computers.

As another aspect of the present invention, the arrangement and composition of parts shown in FIGS. 4 and 5 can be used also as a light modulator.

As a carrier means to send signals to remote places, radio waves have heretofore been widely used. In recent years, methods and means for carrying signals in light beams, that is, so-called "light communication," is being considered. Light has sharp directivity, and since it passes readily through the ionosphere surrounding the earth, it is especially advantageous as a means for space communication.

The present invention contemplates the provision, through the use of a gyroelectric substance, an element capable of converting a pulsive electrical signal into a rotational angle of the polarization plane of plane-polarized light.

The utilization of the so-called "electro-optic effect" for pulsive modulation of light is known in the art. By this method, a high voltage is necessary for obtaining a large magnitude of modulation. By the method of utilizing gyroelectrics according to the invention, it is possible to obtain full modulation (that is, pulsive modulation such that polarization planes mutually form 90° therebetween) with relatively low voltage, as described more fully hereinbelow with respect to the operation of a light modulator.

Figure 7:
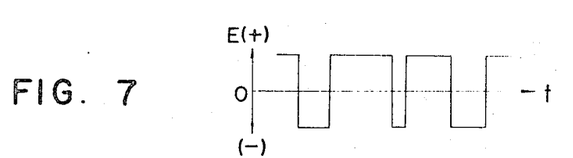
FIGS. 7, 8, and 9 are waveform time charts indicating light modulation characteristics due to a light modulator which constitutes another embodiment of the invention.
Figure 8:
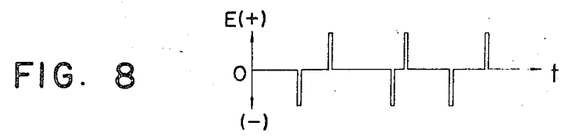
Figure 9:
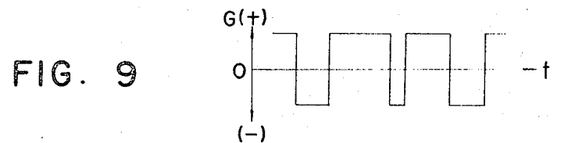

Into the input circuit 4 of a light modulator, an input signal of a form shown in FIG. 7 or FIG. 8 is introduced. In FIGS. 7 and 8, the abscissa represents time, and the ordinate represents voltage. When a voltage of this form with plus-minus variation of voltage enters the input circuit 4, the plane-polarized light leaving the gyroelectric crystal 1 has a form, as indicated in FIG. 9, of rotatory state alternating in correspondence with the input signal as shown in FIG. 7 or FIG. 8. In FIG. 9, the abscissa represents time, and the ordinate represents the rotational angle of the polarization plane. In this case, since the angle between the two polarization planes can readily be caused to be 90°, it is possible to achieve full modulation with a relatively low voltage.

The present invention, in still another aspect thereof, contemplates the provision of a new logical operation apparatus wherein the memory element of the invention is used, as described in detail hereinbelow.

This logical operation apparatus can be constructed by adjusting the rotational angles of the polarization planes of the plane-polarized light entering a gyroelectric substance and the plane-polarized light which has passed through said substance, that is, adjusting these rotational angles, for example, to 45° or 30°, and using the gyroelectric substance either singly or as a combination of a plurality thereof. An apparatus so constructed has a simple arrangement and composition and easy manipulation and is capable of receiving logical variables electrically (dielectrically) and producing logical functions by light (transmitted light).

The term "logical manipulation" is herein used to designate the operation whereby, in mathematical terms, the value of $Y$ is determined when one function $Y = f(X_1, X_2, \ldots, X_n)$ of $n$ logical variables $X_1, X_2, \ldots, X_n$ is defined, and $X_1, X_2, \ldots, X_n$ are given. The term "logical variable" is herein used to designate a variable which assume only the two values of 0 and 1, and, similarly, $Y$ also being a logical variable assumes only the two values 0 and 1. Such a function $f(X_1, X_2, \ldots, X_n)$ is herein called a logical function.

Logical operation apparatuses of similar type, together with memory devices, constitute the essential parts of computers and other man-made thinking devices, and in recent electronic computers electronic devices such as two-electrode and multi-electrode vacuum tubes, semiconductor rectifiers, transistors, coils with ferromagnetic materials as magnetic cores, and ferroelectric capacitors are being used as logical operation elements.

However, under the present circumstances wherein further increase in speed is desired, the methods utilizing these electronic devices encounter limiting barriers due to the nature of these devices. For this reason, studies on the use of light for logical manipulation are being conducted, but the results to date have not been reduced to practical use.

In order to carry out the logical operation $$Z = f(X, Y)$$

in a logical operation apparatus, in which the memory element of the invention is used, the logical variables $X$ and $Y$ are introduced as voltages, and the logical function $Z$ is extracted as rotation of the plane of vibration of plane-polarized light.

Figures 10, 11:
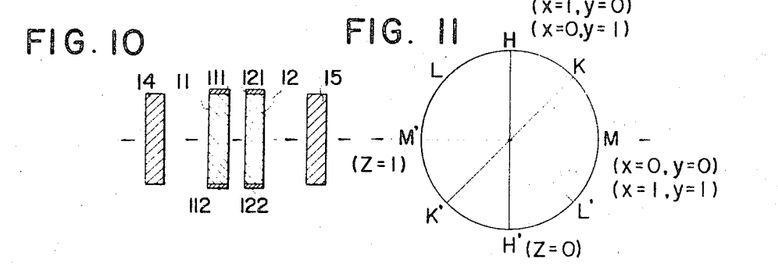
FIGS. 10, 13, and 15 are elevational sectional views respectively showing different examples of a logical operation apparatus constituting still another embodiment of the invention.
FIGS. 11, 12a, 12b, 14a, 14b, and 16 are graphical representations indicating the principle in the case when logical operations are carried out through the use of the logical operation apparatuses shown in FIGS. 10, 13, and 15.

In one example of a logical operation device, in which memory elements of the invention are used as shown in FIG. 10, there are disposed in coaxial arrangement a polarizer 14, gyroelectric crystals 11 and 12, pairs of voltage application electrodes 111, 112 and 121, 122 for respectively applying logical variables $X$ and $Y$, and an analyzer 15 for determining the logical function $Z$.

The above-described apparatus can be used to carry out the following logical operation.

| X | 0 | 1 | 0 | 1 |     |
|---|---|---|---|---|-----|
| Y | 0 | 0 | 1 | 1 | (1) |
| Z | 1 | 0 | 0 | 1 |     |

For this purpose, by adjusting the gyroelectric crystals 11 and 12 so that the planes of vibration of the incident plane-polarized light rotate respectively by 45°, causing the logical viriables $X$ and $Y$ to be 0 when the voltage applied to the electrodes 111, 112 and 121, 122 is positive and to be 1 when the voltage is negative, and applying a voltage of a polarity corresponding to the values of the logical variables $X$ and $Y$, it is possible to determine the logical function $Z$ by the rotation of the polarization plane.

The principle of the above-described operation may be described with respect to FIG. 11, in which planes of vibration mutually forming angles of 45° are represented by diametric lines HH', KK', LL', and MM'. When the plane-polarized light whose plane of vibration has been caused by the polarizer 14 to become HH' enters the gyroelectric substances, a positive voltage is applied to the gyroelectric substances 11 and 12 in the case when $X = 0$ and $Y = 0$.

Consequently, the plane of vibration is caused by the gyroelectric substance 11 to rotate 45° to become KK' and then caused by the gyroelectric substance 12 to rotate a further 45° to become MM'.

In the case of $X = 1$ and $Y = 0$ or in the case of $X = 0$ and $Y = 1$, the rotations due to the gyroelectric substances 11 and 12 cancel each other, and the plane of vibration of the outgoing plane-polarized light becomes HH'.

In the case of $X = 1$ and $Y = 1$, the rotations are in the direction opposite to that in the case of $X = 0$ and $Y = 0$, and the plane of vibration becomes MM'. This is, when the logical function $Z$ is 1, the plane of vibration becomes MM', and when the logical function $Z$ is 0, the plane of vibration is HH'. Since these planes of vibration are mutually perpendicular, it is possible, by setting the plane of light vibration of the analyzer 15 so that it becomes, for example, MM', to cause the outgoing polarized light MM' to pass completely and to shut off completely the outgoing polarized light HH'. That is, in the case when light passes, the logical function $Z$ becomes $Z = 1$, and in the case when light is shut off, the logical function $Z$ becomes $Z = 0$.

Another logical operation that can be carried out is represented as follows.

| X | 0 | 1 | 0 | 1 |

| Y | 0 | 0 | 1 | 1 | (2) |
| Z | 0 | 1 | 1 | 1 | |

In this case, by so setting the apparatus that the planes of vibration of the polarized light are caused by the gyroelectric crystals 11 and 12, respectively, to rotate by 30°, it is possible to determine the logical function Z by the rotation of the polarization plane similarly as in the previous example.

Figure 12A:
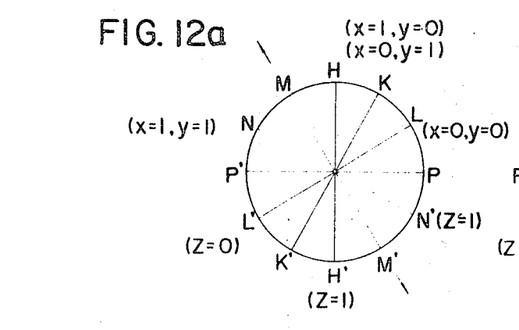

The principle of the above described operation will be apparent from the following description with reference to FIG. 12, in which (FIG. 12a) there are shown planes of vibration HH', KK', LL', MM', NN', and PP' which mutually form angles of 30°. When an incident light plane-polarized by the polarizer 14 as in the foregoing example and having a plane of vibration HH' is projected through the gyroelectric substances, the vibration plane is rotated to LL' when $X = 0$ and $Y = 0$. When $X = 1$ and $Y = 0$ and when $X = 0$ and $Y = 1$, the outgoing light has a vibration plane in the state HH'. When $X = 1$ and $Y = 1$, the vibration plane rotates to NN'. Accordingly, by setting the light vibration plane of the analyzer 15 so that it becomes MM', the outgoing polarized light LL' is completely shut off, and the outgoing polarized lights HH' and NN' pass through with equal intensities.

Figure 12B:
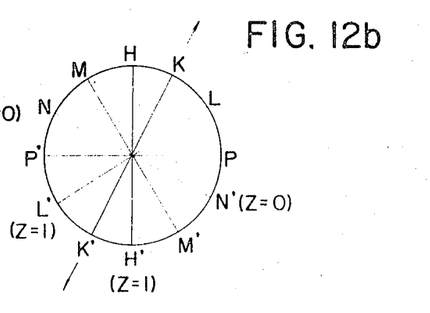

In this case, if the light vibration plane of the analyzer 15 is set to KK', it will be also possible by means of this logical operation apparatus to carry out the logical operation represented by the following relationship as shown in FIG. 12b.

| X | 0 | 1 | 0 | 1 | |
| Y | 0 | 0 | 1 | 1 | (3) |
| Z | 1 | 1 | 1 | 0 | |

Thus, by merely rotating the light vibration plane of the analyzer through 60° in this manner, it is possible to carry out either of the two operations (2) and (3) as desired.

Figure 13:
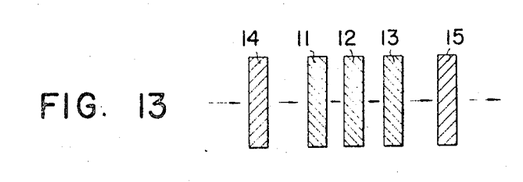

Rotation of the analyzer, however, requires mechanical manipulation. For this reason, in order to obtain a non-mechanical effect corresponding to the required manipulation, another gyroelectric crystal 13 is used and disposed as shown in FIG. 13, whereby said rotation can be accomplished electronically. In this case the rotational angle of the gyroelectric substance 13 is set at 30°.

Figures 14A, 14B:
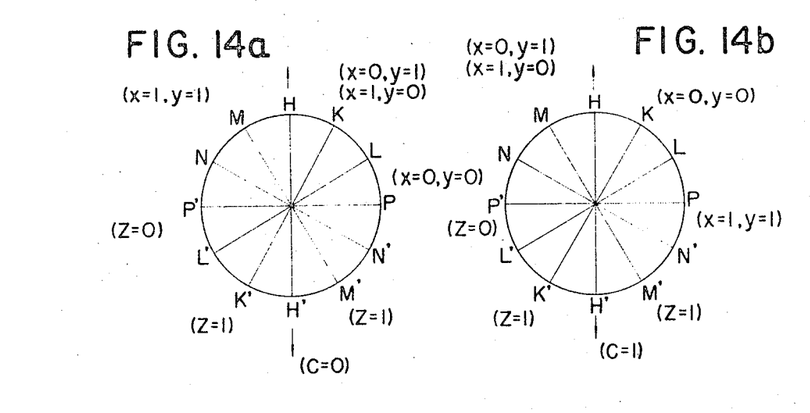

By this arrangement, the vibration plane HH' of the incident polarized light is rotated by 30-° steps by the gyroelectric crystals 11, 12, and 13 in the case of $C = 0$, $X = 0$, and $Y = 0$ as can be seen in FIG. 14a, and the light is finally projected out with a vibration plane PP'. In the case of $C = 0$, $X = 1$, $Y = 0$ or in the case of $C = 0$, $X = 0$, and $Y = 1$, the light is projected out with a vibration plane KK', and in the case of $C = 0$, $X = 1$, and $Y = 1$, the light is projected out with a vibration plane MM'. Furthermore, in the case of $C = 1$, $X = 0$, and $Y = 0$, the vibration plane is rotated to KK'; in the case of $C = 1$, $X = 0$, and $Y = 1$ or of $C = 1$, $X = 1$, and $Y = 0$, it is rotated to MM'; and in the case of $C = 1$, $X = 1$, and $Y = 1$, it is rotated to PP'.

Therefore, by setting the light vibration plane of the analyzer 15 to HH', the entire apparatus carries out the above operation (2) when $C = 0$ and carries out the above operation (3) when $C = 1$. That is, the switching between the logical operations (2) and (3) can be accomplished by changing the polarity of the voltages applied to the gyroelectric substance 13.

Figures 15, 16:
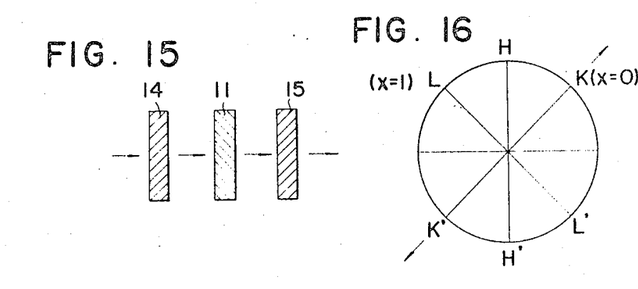

A logical "NOT" operation of the form represented below can be carried out as indicated in FIGS. 15 and 16.

| X | 0 | 1 | (4) |
| Z | 1 | 0 | |

For this operation, one gyroelectric crystal 11 adapted to cause a 45-° rotation of the polarization plane is used. In this case, as indicated in FIG. 16, the vibration plane HH' of the incident polarized light is rotated to KK' when $X = 0$ and to LL' when $X = 1$. Therefore, by setting the light vibration plane of the analyzer 15 to KK', the outgoing polarized light KK' completely passes through, and the outgoing polarized light LL' is completely shut off, whereby the logical Z can be determined.

By combining the fundamental operations described above, it is possible to carry out logical manipulation.

As is apparent from the above description, by the practice of the present invention, it is possible to apply logical variables by pulses, to determine logical functions by light, and, without the use of mechanical parts as apparatus components, to carry out various logical operations by combining gyroelectric crystals. The invention has the further advantage of high speed in carrying out operations, whereby the invention is effectively applicable to electronic computers, particularly computers, in which light is utilized.

Relevant to this disclosure, in Review of Modern Physics, No. 34, (1962), pp. 567–574, I have disclosed the possibility of classifying regular ferroelectrics into 19 species in accordance with their types of point group, Bravais lattice, and ferroelectric state transition (polarization reversal). As a result of tensor analysis, it has been found that, of these, those which can become gyroelectric crystals are, on the criterion of capability of reversing the sign of the rotatory power or gyration tensor (axial tensor of rank two) according to the electric field, restricted to those belonging to the nine species of: 1, n, 2, mm2, 4-I, 6-I, 3-TR-I, 3-HP-I, and 3-HR-II. Here, I and II indicate the distinction between those having more than one specie even in the case of those belonging to the same point group according to the point group, lattice, and state transition type, 4-I and 6-I each indicating one specie of two species, 3-TR-I indicating one specie of two species, 3-HR-I and 3-HP-II indicating two species of four species, and TR and HP respectively denoting trigonal R lattice and hexagonal P lattice.

The aforementioned triglycine sulfate belongs to specie 2, sodium nitrite belongs to specie mm2, and lithium trihydrogen selenite belongs to specie m. It should be noted that there is a possibility of some irregular ferroelectrics being used as gyroelectric substances.

As will be apparent from the foregoing description with respect to a few enbodiments of the present invention, the memory element of the invention has two stable states of mutually opposite sign of rotatory power of a gyroelectric substance in the absence of an electric field and is adapted to utilize the alternation of these states due to an electric field. Accordingly, the memory element of the invention has the advantage of non-destructive writing-in and reading-out.

Furthermore, since the memory element is capable of converting electrical input into light characteristics and varying the rotatory angle at will by selecting the specie of gyroelectric crystal and its thickness, its operation time is short. Accordingly, the memory device of this invention can be used effectively in constructing memory devices, light switches, light modulators, logical operation apparatuses, and like devices without the use of mechanical operation parts. The utility of the present invention is believed to be particularly pronounced in applications to apparatuses and systems such as electronic computers, light computers, and communication systems and equipment.

U.S. Pat. No. 3,374,473 (S.E. Cummins) discloses an art, wherein, when a voltage above the threshold value thereof is applied to ferroelectric bismuth titanate ($Bi_4Ti_3O_{12}$), the spontaneous polarization vector of this crystal slightly varies, the variation of which inevitably brings to the crystal a variation in strain with the consequent change in refractive index ellipsoid. In short, this patented invention is primarily to utilize the change in the refractive index ellipsoid brought about by spontaneous polarization reversal.

A report on "Ferroelectric Ceramic Electro-optic Materials and Devices" by Land et al. contained in "Proceeding of the IEEE, Vol. 57 (No. 5), 1969, pp 751–768" mentions that electro-optical effect of ceramic (double refraction phenomenon created by application of a voltage to ceramic substance) is utilized.

The present invention makes use of a phenomenon, in which the rotatory state of a gyroelectric substance alternates due to reversal in spontaneous polarization. Moreover, as no variation in strain within the crystal structure is accompanied by variation in the spontaneous polarization as in the case of U.S. Pat. No. 3,374,473, no influence is given upon any other optical system, when it is used in combination with other optical lenses (e.g., the focal distance of the optical system is not affected by the variation in strain). Also, as the alternation of the rotatory state has a kind of memory state, no voltage needs be applied during exhibition of the required electro-optical effect, i.e., once a required state is manifested, the state can be continuously maintained in an infinite time period without the voltage application.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What I claim is:

1. A memory device comprising, in axial alignment: two polarizers disposed in mutually parallel relationship; at least one crystal element of lithium trihydrogen selenite whose opposing terminal surfaces are cut in the direction perpendicular to the optical axis of the crystal element with a thickness between the terminal surfaces being made sufficient to cause rotation of the polarization plane at a required angle with respect to light passing through the crystal in the direction of the optical axis thereof; and electrical means provided on said lithium trihydrogen selenite crystal element and to apply an electric field component sufficient to alternate a rotatory state of the crystal element to another rotatory state of opposite code in the direction of the spontaneous polarization of said crystal element.

2. A memory device comprising, in axial alignment: two polarizers disposed in mutually parallel relationship; a group of lithium trihydrogen selenite crystal elements disposed between said two polarizers, wherein a plurality of lithium trihydrogen selenite crystal elements, the opposing terminal surfaces of which are cut in the direction perpendicular to the optical axis of each crystal element with a thickness between the terminal surfaces made sufficient to cause rotation of the polarization plane at a required angle with respect to light passing through each crystal element, are mutually arranged in the relationship of lines and rows on the one and same vertical plane with respect to incident light; and electrical means provided on each of said crystal elements of the group and to apply electric field component sufficient to alternate a rotatory state of each crystal element to another rotatory state of opposite code in the direction of the spontaneous polarization of said each crystal element.

3. A memory device according to claim 2, in which the electric field impressing means provided on each of the crystal elements and to alternate the rotatory state of said each crystal element causes a required logical operation to be conducted between each of the crystal elements.

4. A logical operation device comprising: two polarizers disposed in mutually parallel relationship; two crystal elements of lithium trihydrogen selenite, the opposing terminal surfaces of each of which are cut in the direction perpendicular to the optical axis thereof with a thickness between the terminal surfaces being set 130 mm, and each of which is disposed between the two polarizers in series with the direction of the light incidence; and electrical means provided on each of said crystal elements of lithium trihydrogen selenite and to apply electric field component sufficient to alternate a rotatory state of the crystal element to another rotatory state of opposite code in the direction of the spontaneous polarization of said crystal element.

5. A logical operation device as claimed in claim 4, in which the electric field impressing means to alternate the rotatory state of each crystal element causes the rotatory state of each crystal element of lithium trihydrogen selenite to vary in logical operation manner, thereby to cause light passing through the logical operation device to perform the required logical operation.

6. A logical operation device comprising: two polarizers disposed in mutually parallel relationship; two crystal elements of lithium trihydrogen selenite the opposing terminal surfaces of which are cut in the direction perpendicular to the optical axis of each crystal element with a thickness between the terminal surfaces being set 86 mm, and each of which is disposed between the two polarizers with the terminal surfaces thereof made vertical to and with the elements mutually in series with the direction of the light incidence; and electrical means provided on each of said crystal elements of lithium trihydrogen selenite and to apply electric field component sufficient to alternate a rotatory state of the crystal element to another rotatory state of opposite code in the direction of the spontaneous polarization of said crystal element.

7. A logical operation device as claimed in claim 6, in which three crystal elements of lithium trihydrogen selenite are disposed between said deflection plates.

8. A logical operation device according to claim 6, in which the electric field impressing means for alternating the rotary state of each crystal element causes the rotatory state of each element to vary in logical operation manner, thereby to cause light passing through the logical operation device to perform logical operation device.

9. A memory device comprising a memory element in which there is used a gyroelectric substance selected from the group consisting of triglycine sulfate, sodium nitrate and lithium trihydrogen selenine, having in the absence of an electric field two stable states of mutually opposite sign of rotary power, said two states being alternatable in accordance with an electric field applied to said gyroelectric substance, means to apply writing-in voltage to said memory element, means to polarize incident light and project the resulting polarized light to said element in such a manner that the path of the light is coincident with the optical axis of said element, and means to analyze light which has been so caused to pass through said memory element thereby to carry out reading out, whereby writing in and reading out are accomplished.

10. A light switch comprising in combination the memory element according to claim 9, a polarizer to polarize incident light and project the resulting polarized light to said memory element, electrodes to apply input voltage to said memory element, and an analyzer to analyze polarized light passing through said memory element, and carrying out switching action through utilization of the alternation, due to an electric field, of the light rotational angle of the gyroelectric substance constituting said memory element.

11. A light modulator comprising the memory element according to claim 9, voltage application means to supply input signals to said memory element, light polarizing means to obtain plane-polarized light, and light analyzing means to analyze light passing through said memory element, and operating to convert electrical pulse signals into rotational angle of the plane of polarization of the plane-polarized light and into states of transmission and shut off light.

12. A logical operation apparatus wherein at least one memory element according to claim 9, is used and caused to carry out logical operation.

13. A logical operation apparatus wherein at least one memory element according to claim 9, is used and caused to carry out logical operation, for which operation the light rotational angle of the gyroelectric substance constituting said memory element is controllably caused to be an angle selected from 30° and 45° of angle.

14. A logical operation apparatus to carry out logical operation through the use of the memory element according to claim 9, having a gyroelectric substance in said memory element adapted to have a light rotational angle of 45° and having voltage application means to apply logical variables to said gyroelectric substance, said gyroelectric substance and said voltage application means being combined with polarizing means and analyzing means for determination of a logical function, thereby to carry out logical "NOT" operation.

15. A logical operation apparatus to carry out logical operation through the use of two memory elements according to claim 9, having two gyroelectric substance units in said memory elements each adapted to have a light rotational angle of 30° and having voltage application means to apply logical variables to said gyroelectric substance units, said gyroelectric substance units and said voltage application means being combined with polarizing means and analyzing means for determination of logical functions, thereby to carry out logical "AND" and logical "OR" operations.

16. A logical operation apparatus to carry out logical operation through the use of two memory elements according to claim 9, having two gyroelectric substance units in said memory elements each adapted to have a light rotational angle of 45° and having voltage application means to apply logical variables to said gyroelectric substance units, said gyroelectric substance units and said voltage application means being combined with polarizing means and analyzing means for determination of logical functions, thereby to carry out logical "AND" and logical "OR" operations.

17. A logical operation apparatus to carry out logical operation through the use of three memory elements according to claim 9, having three gyroelectric substance units in said memory elements each adapted to have a light rotational angle of 30° and having voltage application means to apply logical variables and to switch logical operation between the logical operations of

| | | | | |
|---|---|---|---|---|
| X | 0 | 1 | 0 | 1 |
| Y | 0 | 0 | 1 | 1 |
| Z | 0 | 1 | 1 | 1 | and

| | | | | |
|---|---|---|---|---|
| X | 0 | 1 | 0 | 1 |
| Y | 0 | 0 | 1 | 1 |
| X | 1 | 1 | 1 | 0 | said gyroelectric substance units and said voltage application means being combined with polarization means and analyzing means for determination of logical functions, thereby to carry out logical operations.

* * * * *